United States Patent [19]

Plummer

[11] Patent Number: 4,882,594
[45] Date of Patent: Nov. 21, 1989

[54] METHOD FOR MAKING A SMOOTH, UNIFORM IMAGE OF A LASER DIODE ARRAY

[75] Inventor: William T. Plummer, Concord, Mass.

[73] Assignee: Polaroid Corporation, Cambridge, Mass.

[21] Appl. No.: 252,658

[22] Filed: Oct. 3, 1988

[51] Int. Cl.⁴ .................. G01D 15/14; G02B 5/30; G11B 7/00
[52] U.S. Cl. .................. 346/108; 350/401; 350/402; 369/121
[58] Field of Search .............. 346/76 L, 108, 160; 350/401, 402; 369/121, 122

[56] References Cited

U.S. PATENT DOCUMENTS 4,198,123  4/1980  Kremen .................. 350/401
4,822,151  4/1989  Tatsuno .................. 350/402

OTHER PUBLICATIONS

Diffraction Theory of Microscopic Vision, A. B. Porter, Phil. Mag. S. 6., vol. 11, No. 61, Jan. 1906.

*Primary Examiner*—Clifford C. Shaw
*Assistant Examiner*—Mark Reinhart
*Attorney, Agent, or Firm*—Francis J. Caufield

[57] ABSTRACT

Phase array apparatus for use with a lens system to provide a substantially smooth, uniform image of a laser array comprised of a multiplicity of lasers wherein the phase of the radiation emitted by the lasers alternates by an amount which is substantially equal to 180°. The phase array includes: (1) phase means, disposed substantially at a far-field image of the laser array formed by the lens system, which far-field image comprises two prominent lobes, for changing the phase of the radiation in the two prominent lobes by 90° with respect to the phase of the remaining radiation in the far-field image in order to convert the near-field image of the laser array into a finite-length sine pattern and (2) means, such as a wedge prism or a split lens, disposed preferably near a far-field image but not at a near-field image, for angularly shifting one half of the phase shifted far-field image with respect to the other to form a pair of near-field images which are spatially shifted with respect to each other by one-half cycle of the sine wave, whereby a substantially smooth, uniform image of the laser array is formed.

9 Claims, 2 Drawing Sheets

METHOD FOR MAKING A SMOOTH, UNIFORM IMAGE OF A LASER DIODE ARRAY

TECHNICAL FIELD OF THE INVENTION

The present invention generally relates to apparatus for use in laser printing and, in particular, to apparatus for providing a uniform image of a laser diode array for use in laser printing applications.

BACKGROUND OF THE INVENTION

A laser printer typically prints on a radiation- or thermally-sensitive recording medium in which some physical or chemical property of the medium is changed in response to receiving an amount of radiation or heat that exceeds some threshold level. Thus, the creation of the image is dependent on the intensity of the incident or writing radiation. For example, in a typical recording medium, there is a 1:3 intensity ratio from threshold excitation of the recording medium to its destruction. As a result, the writing radiation is required to be focused onto the recording medium as a spot which has a substantially smooth, uniform intensity thereacross where a substantially smooth, uniform intensity means that the peak to valley intensity ratio in the spot is to engineering tolerance smaller than the threshold to burn-off ratio of the recording medium.

In addition, laser printers may use laser diodes to provide writing radiation. But, their usual output, which is in the range between 20 to 50 mW, would require the use of more than one arranged in an array where the media needed more energy for exposure than was available with only one diode. As a consequence, a laser printer could utilize an array comprised of a multiplicity of such laser diodes to provide an amount of radiative power suitable for printing. For example, a typical laser printer application might utilize an array comprised of as many as ten such laser diodes fabricated on the same semiconductor chip.

However, such arrangements may have still further problems. In particular, if the laser diodes in the array are spaced too far apart from each other, the array and the accompanying electronics may be expensive and it also becomes more difficult to produce a smooth, uniform intensity spot. Conversely, if the laser diodes in the array are spaced too closely together, mode hopping and other physical effects occur resulting in nonuniform radiation output from the array. Nevertheless, it is possible to achieve a configuration with an "intermediate" spacing that solves the above-described problems. For example, an array where each laser diode on the semiconductor chip has a 6 micron by 1 micron active stripe overcomes the above-described problems when the diodes are spaced approximately 4 microns from each other. While such a spacing appears to solve the above-described, it causes the phase of the output field from the laser diodes to alternate by an amount substantially equal to 180°. In other words, the phases are coherent and alternate as follows: +−+−+−+−+−. When the radiation emitted by such a laser diode array is focused to a spot onto the recording medium, forming an image of the ten small stripes themselves, called the "near field" image, there may be unacceptably large variations in intensity across the spot. These variations can be troublesome where they exceed the threshold to burn-off ratio, causing nonuniform printing across the spot.

Alternately, when the radiation emitted by such a laser diode array is focused to a spot onto the recording medium by forming an image of the "far field" diffraction pattern of the source array, the alternating phases of the individual stripe elements will typically result in a splitting of the spot into two parts, with a dark center line. This far-field image also has an undesirable variation of intensity.

Attempts have been made in the prior art to solve the alternating phase problem and, thereby, the non-uniform spot illumination problem in the far-field image by placing a phase grating directly on the diode array in order to compensate the phases of the diode outputs. However, such a solution has been found to be undesirable in practice because such phase gratings are difficult to fabricate and tend to be damaged when exposed to the high intensity radiation used for laser printing.

As a result, there is a need in the art for an apparatus which will provide a substantially smooth, uniform image of a multiple-element laser diode array which has substantially alternating phase output from the individual lasers. Further, there is a need for such an apparatus which will provide the substantially smooth, uniform image even when the individual elements of the array are not equally bright and are not perfectly stable in phase.

SUMMARY OF THE INVENTION

Embodiments of the present invention are used with a lens system to provide a substantially smooth, uniform image of a multiple-element laser diode array which has substantially alternating phase output from the individual elements, even when the individual elements are not equally bright and are not perfectly stable in phase. In particular, embodiments of the pesent invention form a phase array apparatus which comprises: (1) phase means, disposed substantially at the far-field image of the laser array formed by the lens system, which far-field image comprises two prominent lobes, for changing the phase of the radiation in the two prominent lobes by an amount which is substantially equal to an odd multiple of 90° with respect to the phase of the remaining radiation in the far-field image in order to convert the near-field image of the laser array substantially into an oscillatory wave pattern such as a finite-length sine pattern and (2) shifting means, such as a wedge prism or a split lens, disposed at or after the far-field image but just before the near field image, for angularly shifting the half of the area of the phase shifted far-field image with respect to the other half to form a pair of near-field images which are spatially shifted with respect to each other by an amount which is substantially equal to an odd multiple of one-half cycle of the oscillatory wave pattern, whereby a substantially smooth, uniform image of the laser array is formed.

One should note that the use of the shifting means ensures that embodiments of the present invention will improve the smoothness and uniformity of the spot formed on the recording medium even if the individual elements of the laser array are not equally bright and are not perfectly stable in phase. In practice, it is preferred that the ratio of the size of the aperture of an individual laser, i.e., the light-emitting area, to the center-to-center spacing of the lasers in the array be sufficiently large. In practice, good resultant uniformity in a subsequent near-field image should be achieved if the ratio is at least as large as 25%.

In one embodiment of the present invention, the phase means comprises a phase plate having two steps. The steps are disposed at the positions of the two prominent lobes in the far-field image, and the steps are sufficiently deep that radiation passing therethrough experiences a 90° phase shift with respect to radiation passing through other portions of the plate. Further, the means for shifting the two halves of the far-field image comprise a split wedge or a split lens, placed for convenience in the same location.

BRIEF DESCRIPTION OF THE DRAWINGS

The present invention may be understood by considering the following detailed description together with the accompanying drawings, in which.

To facilitate understanding, identical reference numerals are used to designate elements common to the figures.

DETAILED DESCRIPTION

Figure 1:
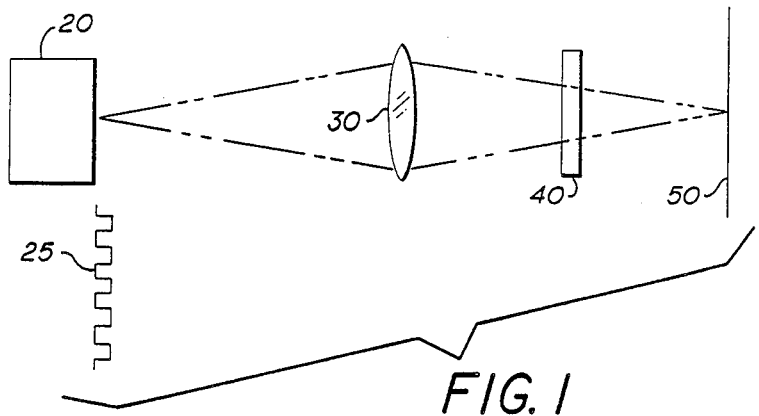
FIG. 1 shows, in pictorial form, the manner in which an embodiment of the inventive phase array apparatus is used.

FIG. 1 shows a block diagram of the manner in which an embodiment of the inventive phase array apparatus for providing a substantially smooth, uniform spot image of multiple-laser array 20 is used. As shown in FIG. 1, laser array 20 emits radiation having an amplitude profile substantially as indicated by curve 25. Further, the phase profile of radiation emitted from laser array 20 is substantially alternating, i.e., adjacent laser diodes in array 20 have phases which alternately differ from one another by an amount which is substantially equal to 180°.

The radiation emitted by laser diode array 20 is focused by lens 30 onto recording medium 50 passing through phase apparatus 40 on the way. Lens 30 has a focal length f and laser diode array 20 is disposed at a distance substantially equal to 2f from lens 30. Recording medium 50 is disposed at a distance substantially equal to 2f behind lens 30 and is disposed, therefore, at the near-field image of laser diode 20. Phase array apparatus 40 is disposed at a distance which is substantially equal to f behind lens 30 and is disposed, therefore, at the far-field image of laser diode 20, i.e., where an infinitely distant source would be focused.

Figure 2:
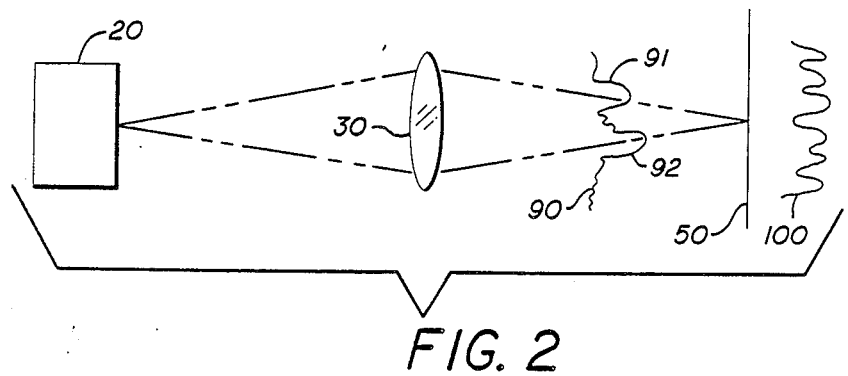
FIG. 2 shows, in pictorial form, the near-field and far-field images of a laser diode array produced by a lens.

FIG. 2 shows, in pictorial form, far-field image 90 and near-field image 100 of laser diode array 20 which are produced by lens 30 when phase array apparatus 40 is not utilized. As shown in FIG. 2, near-field image 100 comprises an oscillatory function of intensity which is not suitable for use in a laser printing apparatus. The near field image is not suitable because the recording medium operates according to a threshold or binary phenomenon where typically there is a 1:3 intensity ratio from threshold excitation of the recording medium to its destruction. As a result, the peak to valley variation of oscillatory curve 100 in FIG. 2 can be too high to provide uniform printing excitation over the illuminated spot.

As shown in FIG. 2, far-field image 90 is an oscillatory function of intensity which is comprised of two prominent lobes 91 and 92. In addition, the energy in near-field image 100 in the area surrounding the center of the spot is substantially comprised of energy from lobes 91 and 92.

Near-field image 100 of laser diode array 20 can be made substantially smooth and uniform by use of apparatus which performs the following two functions. First, near-field image 100 of laser diode array 20 can be converted from the curve shown in FIG. 2 into a curve which is substantially an oscillatory wave pattern such as a finite-length sine wave pattern by apparatus which changes the phase of lobes 91 and 92 in far-field image 90 by an amount which is substantially equal to an odd multiple of 90° with respect to the remaining radiation in far-field image 90. Second, near-field image 100 can then be converted into a substantially smooth and uniform spot by apparatus which displaces half of the radiation in the phase shifted far-field image by an amount which is substantially equal to an odd multiple of one-half cycle of the oscillatory wave pattern with respect to the other half of the radiation. Note, that as a practical matter, the required definition of a substantially smooth and uniform spot is one where the peak to valley intensity ratio in near-field image 100 is smaller, within engineering tolerances, than the burn-off to threshold ratio of the recording medium.

Figure 3:
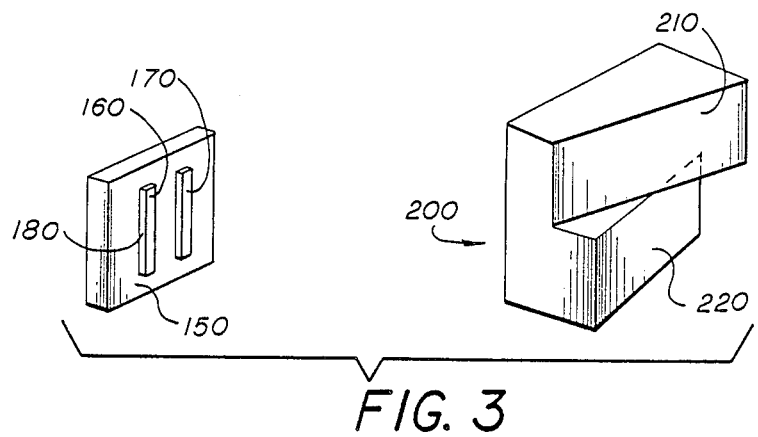
FIGS. 3 and 4 show, in pictorial form, two embodiments of the inventive phase array apparatus for providing a substantially smooth, uniform image of a laser diode array.

FIG. 3 shows an embodiment of inventive phase array 40 for use in changing the phase of the radiation in prominent lobes 91 and 92 of far field image 90 by an amount which is substantially equal to an odd multiple of 90° relative to the remaining radiation and for use in displacing half the radiation in phase shifted far-field image 90 relative to the other half of the radiation by an amount which is substantially equal to an odd multiple of one-half cycle of the oscillatory wave pattern formed in the near-field image. Specifically, as shown in FIG. 3, phase array apparatus 40 comprises phase shifter 150 and wedge prism structure 200. Phase shifter 150 comprises step 160 and step 170, each of which has a sufficiently large depth 180 so that radiation from laser diode array 20 passing through steps 160 and 170 is phase shifted by an amount which is substantially equal to an odd multiple of 90° with respect to radiation passing through other portions of phase shifter 150. Phase shifter 150 may be fabricated from many materials well-known to those of ordinary skill in the art. For example, for laser diodes emitting in the near infrared, phase shifter 150 may be fabricated from from $MgFl_2$, from $BaF_2$ coated with a protective layer of $MgFl_2$ and so forth. Further, it is well known to those of ordinary skill in the art how large depth 180 must be in order to achieve the required phase shift and how large the distance between between steps 160 and 170 must be made for steps 160 and 170 to intercept and phase shift radiation in prominent lobes 91 and 92. nevertheless, it is preferred that in practice the distance between steps 160 and 170 will be determined experimentally.

Further, in accordance with the present invention, wedge prism structure 200 is comprised of wedge prism 210 and wedge prism 220. In use, a structure like wedge prism structure 200 may be disposed at any one of a number of alternative positions in the path of the radiation emitted by laser diode array 20 as long as wedge prism structure 200 is not disposed directly at near-field image 100. For example, such positions range from wedge prism structure 200 being disposed at far-field image 90 to being disposed anywhere between far-field image 90 and near-field image 100.

It is well known to those of ordinary skill in the art how wedge prism structure 200 may be fabricated in order to provide the necessary shifting of radiation. For example, wedge prism structure 200 may be fabricated from evaporated $BaF_2$ and then coated with a protective layer of $MgFl_2$. Further, wedge prism structure 200 may be formed from a plastic material which has been embossed in accordance with methods which are also well known to those of ordinary skill in the art.

As described above, phase shifter 150 combines with wedge prism structure 200 to provide a substantially smooth, uniform near-field image of laser diode array 20 which is suitable for use in laser printers.

It is important to note, however, that although the present invention has been described with respect to its use with a single lens having substantially unit magnification, the present invention is not limited for use with such an optical system. In fact, the inventive phase shifter apparatus may be used in combination with complex lens systems even including repetitious re-imaging as long as the phase shifter means is disposed, as described above, substantially at a far-field image of the lens system and the shifting means is disposed, as described above, either at a far-field image or between a far-field image and a near-field image, but not at a near-field image.

Figure 4:
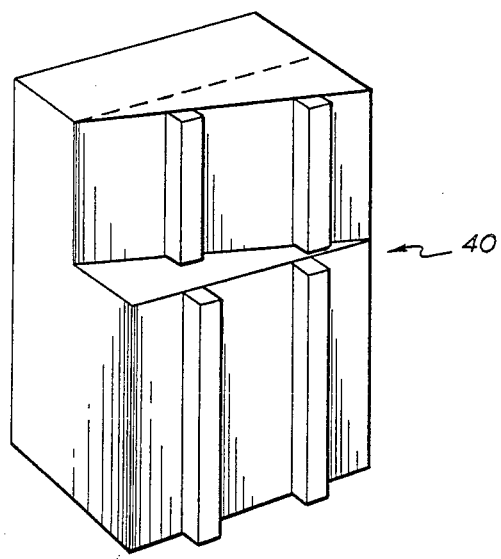

FIG. 4 shows an embodiment of inventive phase array apparatus 40 which is like that shown in FIG. 3 except that phase shifter 150 and wedge prism prism 200 of FIG. 3 are fabricated as a single apparatus.

Figure 5:
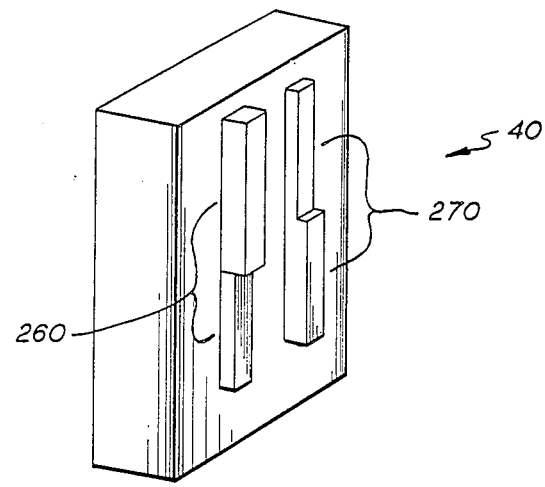
FIG. 5 shows, in pictorial form, a third embodiment of the inventive phase array apparatus for providing a substantially smooth, uniform image of a laser diode array.

FIG. 5 shows still another embodiment of inventive phase array apparatus 40 wherein steps 260 and 270 are themselves of slightly different height so that they can simultaneously provide the phase shifting and displacing functions.

Clearly, those skilled in the art recognize that further embodiments of the present invention may be made without departing from its teachings. For example, split wedge prism structure 200 shown in FIG. 3 may be replaced by a split lens structure which is well known in the art for providing a displacing function. Therefore, it is intended that all matter contained in the above description or shown in the accompanying drawings shall be interpreted as illustrative and not limiting.

What is claimed is:

1. Phase array apparatus for use with a lens system to provide a substantially smooth, uniform image of a laser array comprised of a multiplicity of lasers wherein the phase of the radiation emitted by the lasers alternates by an amount which is substantially equal to 180°, said phase array comprising:

phase means, disposed substantially at a far-field image of the laser array formed by the lens system, which far-field image comprises two prominent lobes, for changing the phase of the radiation in said two prominent lobes by an amount which is substantially equal to an odd multiple of 90° with respect to the phase of the remaining radiation in the far-field image in order to convert the final near-field image of the laser array substantially into an oscillatory wave pattern; and shifting means, disposed near a far-field image but not at a near-field image, for shifting one half of the phase shifted far-field image with respect to the other half to form a pair of near-field images which are shifted with respect to each other by an amount which is substantially equal to an odd multiple of one-half cycle of the oscillatory wave pattern, whereby a substantially smooth, uniform final image of the laser array is formed.

2. The phase array apparatus of claim 1 wherein said phase means comprises a phase plate having two phase shifting portions, each of which phase shifting portions changes the phase of radiation passing therethrough by an amount which is substantially equal to an odd multiple of 90° with respect to radiation passing through other portions of the plate.

3. The phase array apparatus of claim 1 wherein said shifting means comprises a first and a second wedge.

4. The phase array apparatus of claim 1 wherein said shifting means comprises a first and a second lens system.

5. The phase array apparatus of claim 1 wherein said shifting means comprises a split lens.

6. The phase array apparatus of claim 3 wherein said phase means comprises a first, a second, a third and a fourth portion of material, each of which changes the phase of radiation passing therethrough by an an amount which is substantially equal to an odd multiple of 90°, said first and second portions being affixed to or being fabricated as part of said first wedge and said third and fourth portions being affixed to or being fabricated as part of said second wedge.

7. The phase array apparatus of claim 6 wherein all of said wedges and all of said portions are fabricated from plastic.

8. Phase array apparatus for use with a lens system to provide a substantially smooth, uniform image of a laser array comprised of a multiplicity of lasers wherein the phase of the radiation emitted by the lasers alternates by an amount which is substantially equal to 180°, said phase array comprising:

phase array means, disposed substantially at a far-field image of the laser array formed by the lens system, which far-field image comprises two prominent lobes:

(1) for changing the phase of the radiation in said two prominent lobes by an amount which is substantially equal to an odd multiple of 90° with respect to the phase of the remaining radiation in said far-field image in order to convert the near-field image of the laser array substantially into an oscillatory wave pattern and (2) for shifting one half of said phase shifted far-field image with respect to the other half to form a pair of near-field images which are shifted with respect to each other by an amount which is substantially equal to an odd multiple of one-half cycle of the oscillatory wave pattern, whereby a substantially smooth, uniform image of the laser array is formed.

9. The phase array apparatus of claim 8 wherein said phase means comprises a phase plate having two phase shifting portions each of which changes the phase of radiation passing therethrough by an amount which is substantially equal to an odd multiple of 90° with respect to radiation passing through other portions of said phase plate, each of said phase shifting portions further being formed in the shape of a split wedge, said phase shifting portions combining to shift one half of the far-field image with respect to the other half to form a pair of near-field images which are shifted by an amount which is substantially equal to an odd multiple of one-half cycle of the oscillatory wave pattern with respect to each other.

* * * * *